United States Patent [19]
Vites

[11] Patent Number: 5,810,483
[45] Date of Patent: Sep. 22, 1998

[54] SPINDLE UNIT WITH A SPINDLE SUPPORTED BY PRESTRESSED ANTIFRACTION BEARINGS

[76] Inventor: Boris Vites, Klosterweiher 6, D-52066 Aachen, Germany

[21] Appl. No.: 849,132

[22] PCT Filed: May 12, 1995

[86] PCT No.: PCT/DE95/01880

§ 371 Date: Aug. 8, 1997

§ 102(e) Date: Aug. 8, 1997

[87] PCT Pub. No.: WO96/18048

PCT Pub. Date: Jun. 13, 1996

[30] Foreign Application Priority Data

Dec. 7, 1994 [DE] Germany .............................. 9419561 U

[51] Int. Cl.$^6$ ............................................... F16C 19/08
[52] U.S. Cl. ............................................ 384/517; 384/493
[58] Field of Search .................................... 384/517, 518, 384/563, 493, 557

[56] References Cited

U.S. PATENT DOCUMENTS

| | | | |
|---|---|---|---|
| 4,859,148 | 8/1989 | Hibyan | 384/563 |
| 4,884,903 | 12/1989 | Pham et al. | 384/563 |
| 5,388,917 | 2/1995 | Hibi et al. | 384/517 |

*Primary Examiner*—Lenard A. Footland
*Attorney, Agent, or Firm*—Blank Rome Comisky & McCauley LLP

[57] ABSTRACT

The invention concerns a spindle unit with a spindle, a casing, antifriction bearings that are prestressed and support the spindles on two places at a distance from each other in a casing, and a centrifugal regulator, which reduces the prestress on the antifriction bearings as the rotational speed increases, as a result of which the centrifugal regulator is produced as a springy, axially expanding bush with resilient arch-like parts between two compression components and each mass on the arch-like parts.

4 Claims, 2 Drawing Sheets

SPINDLE UNIT WITH A SPINDLE SUPPORTED BY PRESTRESSED ANTIFRACTION BEARINGS

The invention concerns a spindle unit with a spindle, a casing, antifriction bearings that are prestressed and support the spindles on two places at a distance from each other in a casing, and a centrifugal regulator, which reduces the prestress on the antifriction bearings as the rotational speed increases, as a result of which the centrifugal regulator is produced as a springy, axially expanding bush with resilient arch-like parts between two compression components and each mass on the arch-like parts.

Such a spindle device is known from DE-U-94 04 249. Such spindle units are used, for example, in machine-tool construction. With such a spindle device the prestress of the spindle antifriction bearings can be reduced during high-speed machining. The spindle units can also be used in similar structural components of various machines. The regulator used in the known construction guarantees the correct coordination of the rotational speed of the spindle and the prestress of the antifriction bearing, which is, practically speaking, congruent to the recommended coordination of the rotational speed of the spindle and the prestress of the antifriction bearing (cf., e.g., the 3700 T catalog: SKF precision bearing, pg. 64, reg. 47150001987-03, printed in the Republic of Germany by Weppert GmbH & Co. KG). In comparison with the traditional constructions with hydraulic control of the prestress of the spindle bearing, as is described, e.g., in the journal *Konstruktion* (no. 44, p. A20, 1992 for HSC spindles), the spindle unit is constructed in a simpler fashion in accordance with the above German working model.

By virtue of the fact that the variation of the prestress of the spindle bearing is dependent on the displacement of the inner rotating bearing rings, corrosion caused by friction can occur on the outside surface of the spindle; cf., e.g., *Tribology Handbook*, ed. M. J. Neale, London: Butterworth, 1973, chap. E7. In the case of the known construction named, the regulator with its resilient arch-like parts and the masses arranged on them are located between the bearings for the spindle.

The problem the invention tries to solve is to improve a spindle unit of the type under discussion so that spindle corrosion caused by the displacement of the inner bearing rings with respect to the spindle is avoided, in turn increasing the longevity of the spindle unit.

According to the invention this will be obtained when the regulator is supported by regulator antifriction bearings on its two ends on a casing of the spindle unit; when the regulator does not touch the spindle; when the outer non-rotating rings of the regulator antifriction bearings press against the outer rings of the spindle bearings; and when the regulator is set in rotation with the aid of a springy component, which has a high resistance to rotation and a low resistance to bending, allowing for the axial movement of the regulator with respect to the spindle, as a result of which the springy component is firmly connected to the spindle and regulator.

The regulator consequently acts on the outer ring and is positioned so it can move axially to the spindle. In so doing the danger of a corrosion of the spindle is eliminated because the thrust rings of the regulator displaces the outer nonrotating rings of the spindle bearings while the prestress is being regulated.

The regulator is located, as is usual, between the spindle bearings and requires only a little space. It is, however, also possible to mount the regulator outside the spindle, in which case existing spindle units can be converted. For this purpose the regulator is mounted outside the section on each of whose ends the spindle bearings are located, in which case the outline of the arch of the resilient parts of the regulator has a concave form. With such a construction only minimal changes need to be made in the construction of existing spindle units.

The invention is more clearly illustrated in two working examples with the use of drawings, in which FIG. 1 represents a longitudinal section through a first working example of a spindle unit according to the invention;

Figure 1:
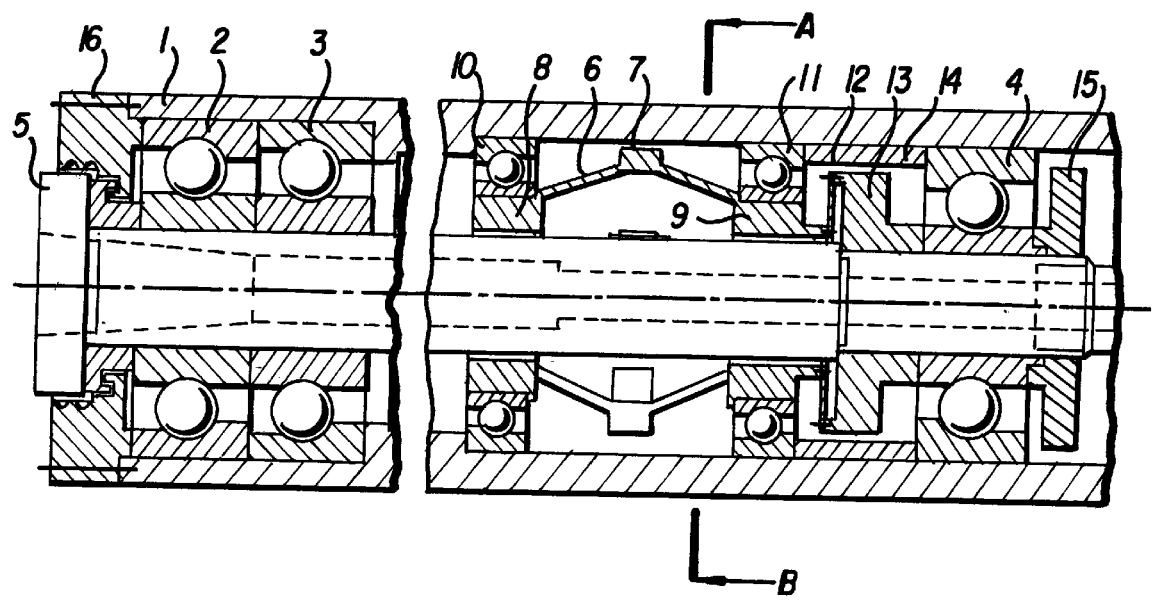

A spindle unit has a casing (1) with spindle bearings (2, 3, and 4) for a spindle (5). To produce a basic prestress and the regulation of the prestress, a centrifugal regulator is foreseen, which consists of resilient parts (6), masses (7) arranged on them, and thrust rings (8 and 9). The resilient parts (6), the masses (7), and the thrust rings (8, 9) are produced as one part. The outline of the arch of the elastic parts (6) has a convex form. The regulator is supported on both of its ends by regulator antifriction bearings (10, 11) on the casing (1) of the spindle unit. An annular membrane (12), which has a high resistance to rotation and a low resistance to bending, is firmly connected to a spacer tube (13) and the thrust ring (9) of the regulator. The spacer tube (13) is mounted between the inner ring of the spindle bearing (4) and an extension of the spindle (5) and connects the regulator and the spindle (5) via the membrane (12). The thickness of the spacer tube (13) also determines the maximum magnitude of the prestress of the spindle bearings (2, 3, and 4)—i.e., in other words, the magnitude of the basic prestress. The distance ring (14) is mounted between the outer rings of the spindle bearing (4) and the regulator antifriction bearings (11); the outside ring of the regulator antifriction bearing (10) is pressed against a back extension of the casing (1). A face of a nut (15) on the end of the spindle is pressed against the inner ring of the spindle bearing (4). The outer rings of the spindle bearing (2 and 3) are mounted between a front extension of the casing (1) and a top (16).

The regulation of the bearing prestress is carried out as follows. To produce the basic prestress the nut (15) is screwed into the threads of spindle (5). The face of the nut (15) is pressed against the inner ring of the spindle bearing (4) and through the spindle bearing (4), the distance ring (14), and the regulator antifriction bearing (11) on the thrust ring (9), by means of which the arches of the resilient parts (6) are bent and the spindle bearings (2, 3, and 4) are opened for the basic prestress. The prestress of the spindle bearing (4), i.e., the displacement of its inner rings with respect to the outer rings, is increased until the spacer tube (13) comes in contact with the extension of the spindle. This goes for the spindle bearings 2 and 3 as well, for the entire spindle, including the inner rings of the spindle bearings 2 and 3, shift back at the same time when the basic prestress is produced.

When the spindle (5) rotates, the regulator is also set in rotation by the membrane (12). The inertia masses (7) generate centrifugal forces, and these produce horizontal constraining forces on the sites where the bent parts (6) are anchored in the thrust rings (8 and 9), consequently reducing the prestress.

Because the annular membrane (12) has a low resistance to bending, the displacements of the thrust rings (9) do not generate any displacements of the spindle (5) by the membrane (12) while the prestress is being regulated. When the prestress is reduced by increasing the spindle's rotational speed, a displacement of the inner rings of the spindle bearings (2, 3, and 4) or the spacer tube (13) with respect to the spindle (5) also does not occur. Instead, the entire spindle (5), including the inner rings of the spindle bearings and the spacer tube (13), shift forward at the same time. The variation of the bearing prestress is only connected with a displacement of the outer nonrotating rings of the spindle bearing (4) and the regulator bearings (10 and 11), as well as the distance ring (14) with respect to the casing (1). In this way the danger of spindle corrosion is eliminated.

Figure 2:
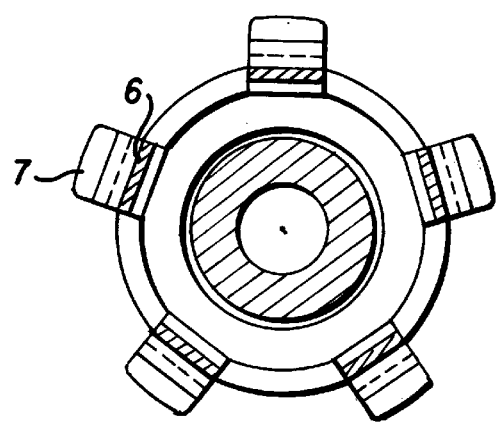
FIG. 2 represents a cut along A-B in FIG. 1.
Figure 3:
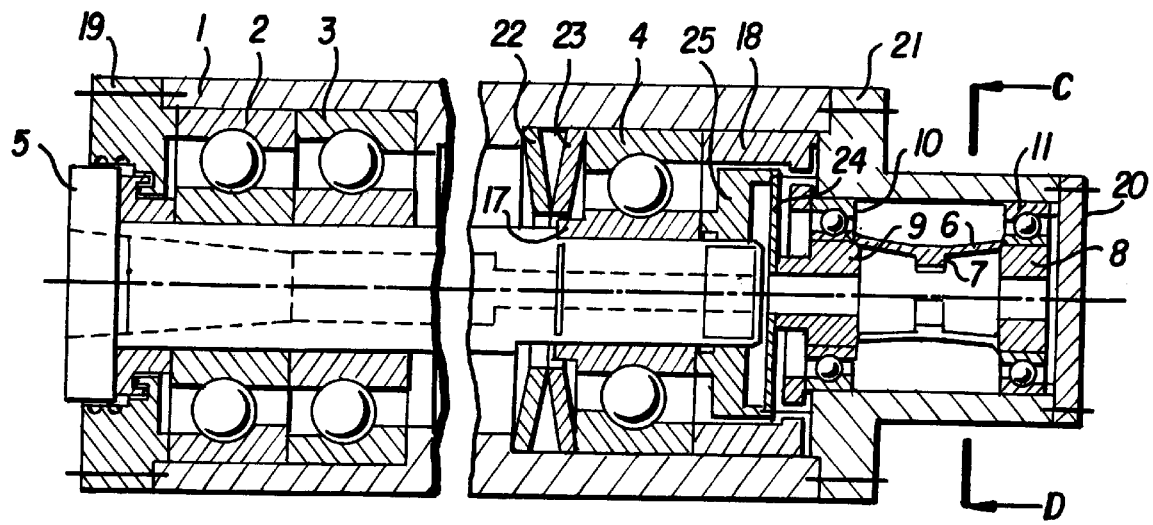
FIG. 3 represents a longitudinal cut through a second working example of a spindle unit according to the invention with a regulator placed outside the spindle.
Figure 4:
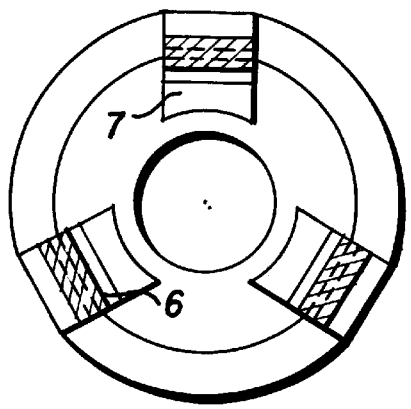
FIG. 4 represents a cut along C-D in FIG. 3.

In FIGS. 3 and 4 a second working example of a spindle unit is represented, in which the regulator and its regulator bearings (10 and 11) lie outside the section on whose ends the spindle bearing is located. It is housed in an additional casing (21). The reference numbers 1 to 11 in FIGS. 3 and 4 designate parts that are the same as those referenced in FIGS. 1 and 2; the reference number (19) in FIG. 3 is a top of the spindle unit and corresponds in this regard to the top (16) in FIG. 1.

In this working example the outline of the arch of the elastic parts (6) has a concave form. The casing (21) is firmly connected to the casing (1). The spindle unit contains cup springs (22, 23), which are mounted between the outer ring of the spindle bearing and an extension of the casing (1). An annular membrane (24) is firmly connected to a nut (25) and a thrust ring (9) of the regulator. The nut (25) runs on the spindle (5); and the face of the nut is pressed against the inner ring of the spindle bearing (4). A distance ring (17) is mounted between the inner ring of the spindle bearing (4) and the extension of the spindle (5), whose thickness determines the maximum magnitude of the prestress of the spindle bearings (2, 3, and 4). A spacer tube (18) is mounted between the outer rings of the spindle bearing (4) and the regulator bearing (10). The annular extension of a back top (20) of the casing (21) presses against the outer ring (11). The thickness of this annular extension determines the preliminary prestress of the deformable part (6). To produce the basic prestress the nut (25) is screwed onto the threaded part of the spindle (5). The face of the nut (5) is pressed against the inner ring of the spindle bearing (4) and bends the cup springs (22 and 23) while the nut continues to be screwed in, as a result of which the basic prestress of the spindle bearings (2, 3, and 4) is adjusted. The prestress of the spindle bearings (2, 3, and 4) is increased until the distance ring (17) comes in contact with the extension of the spindle (5).

While the spindle (5) is rotated, the regulator is also set in rotation by the membrane (24). Because the regulator is placed outside the section on whose end each of the spindle bearings are located, the constraining forces that arise during rotation bear in a direction that runs contrary to that shown in the first working example in FIGS. 1 and 2. For this reason the outline of the arch of the resilient parts (6) has a concave form. In contrast to the first working example according to FIGS. 1 and 2, the prestress of the regulator bearings (10, 11) increases as the prestress of the spindle bearings (2, 3, and 4) decreases. By virtue of the fact that the regulator bearings (10 and 11) can have a smaller diameter than the spindle bearings (2, 3, and 4), it is possible to carry out a desired limitation of the coordination between the rotational speed and prestress for both the spindle bearings 2, 3, and 4 and the regulator bearings 10 and 11 if one uses the bearing model CD, series 719, for the spindle bearing and model ACD, series 70 or 72 (with a relatively higher prestress magnitude (class A, B, C) and relatively lower rotation speed limits) for the regulator bearing. This can mean, e.g., the following bearings, which are listed on pages 62, 72, and 74 of the above-mentioned catalog:

bearing 71920 CD, bore 100 mm prestress in accordance with class A, B, C 230. 460. 920 N rotational speed limit in connection with the grease lubrication 8500 U/min bearing 7012 ACD, bore 60 mm prestress in accordance with class A, B, C 240. 480. 960 N rotational speed limit in connection with the grease lubrication 13000 U/min.

From these data one can see that the reduction of the prestress of the spindle bearing of a maximum magnitude in accordance with class C at a rotational speed of zero to a minimum magnitude in accordance with to class A at a maximum rotational speed corresponding to the speed limit generates an admissible increase in the prestress of the regulator bearing.

In this way the proposed construction eliminates the danger of spindle corrosion and simplifies the use of the centrifugal regulator.

I claim:

1. Spindle unit, which consists of the following components:

a spindle (5), a casing (1), antifriction bearings (2, 3, 4), which support the spindle on two sites at a distance from one another in a casing and which are prestressed, a centrifugal regulator (6, 7, 8, 9) that reduces the prestress on the antifriction bearings as the rotational speed of the spindle increases, and in so doing, the centrifugal regulator is produced as a springy, axially expanding bush with resilient arch-like parts (6) between two compression components (8, 9) and the masses (7) on the arch-like parts, characterized by the fact that a) the regulator is supported by regulator antifriction bearings (10, 11) on both of its ends on a casing (1, 21);

b) the regulator does not touch the spindle (5);

c) the outer nonrotating rings of the regulator antifriction bearings (10, 11) press against the outer rings of the spindle bearing (4); and d) the regulator is set in rotation with the aid of a springy component (12, 24), which has a high resistance to rotation and a low resistance to bending, allowing for an axial movement of the regulator with respect to the spindle, in which case the springy component is firmly connected to the spindle and the regulator.

2. Spindle unit according to claim 1, characterized by the fact that the regulator (6, 7, 8, 9) is mounted outside the section on whose ends the spindle bearings (2, 3, 4) are located, as a result of which the outline of the arch of the resilient parts (6) of the regulator has a concave form.

3. Spindle unit according to claim 2, characterized by the fact that the regulator is placed in a separate casing (21).

4. Spindle unit according to one of the previous claims, characterized by the fact that the resilient parts (6), the masses (7), and the bearing rings (8, 9) together make up a single part.

* * * * *